United States Patent
Li et al.

(10) Patent No.: US 12,546,934 B2
(45) Date of Patent: Feb. 10, 2026

(54) OPTICAL FIBERS, OPTICAL FIBER ASSEMBLIES, AND OPTICAL CONNECTIONS HAVING AN ARRAY OF OPTICAL FIBERS

(71) Applicant: Corning Research & Development Corporation, Corning, NY (US)

(72) Inventors: Ming-Jun Li, Horseheads, NY (US); Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 420 days.

(21) Appl. No.: 18/075,579

(22) Filed: Dec. 6, 2022

(65) Prior Publication Data
US 2023/0194776 A1 Jun. 22, 2023

Related U.S. Application Data

(60) Provisional application No. 63/288,082, filed on Dec. 10, 2021.

(51) Int. Cl.
*G02B 6/028* (2006.01)
*G02B 6/02* (2006.01)
*G02B 6/43* (2006.01)

(52) U.S. Cl.
CPC ......... *G02B 6/028* (2013.01); *G02B 6/02395* (2013.01); *G02B 6/43* (2013.01)

(58) Field of Classification Search
CPC ...... G02B 6/028; G02B 6/02395; G02B 6/43; G02B 6/0288; G02B 6/0281; G02B 6/0365; G02B 6/403; G02B 6/03683
See application file for complete search history.

(56) References Cited

U.S. PATENT DOCUMENTS

| | | |
|---|---|---|
| D31,209 S | 7/1899 | Mark |
| 6,764,221 B1 | 7/2004 | De Jong et al. |
| 10,126,495 B2 * | 11/2018 | Bickham ............ G02B 6/02395 |

(Continued)

FOREIGN PATENT DOCUMENTS

JP 61-183607 A 8/1986

OTHER PUBLICATIONS

Benjamin, S., et.al., "336-Channel electro-optical interconnect: Underfill process improvement, fiber bundle and reliability results," Proceedings—Electronic Components and Technology Conference, Sep. 2014, pp. 1021-1027.

(Continued)

*Primary Examiner* — John Bedtelyon
(74) *Attorney, Agent, or Firm* — Michael E. Carroll, Jr.

(57) ABSTRACT

In one embodiment, an optical fiber includes an inner core having a core refractive index delta and profile shape parameter α in the range of 1.8 to 2.6, including endpoints, and a cladding layer surrounding the inner core. The cladding layer includes an inner cladding segment having an inner refractive index delta, a trench segment having a trench refractive index delta, and an outer cladding segment having an outer refractive index delta. The optical fiber further includes a coating layer surrounding the cladding layer and having a thickness of less than 30 μm and a modulus greater than or equal to 0.5 GPa.

38 Claims, 8 Drawing Sheets

(56) References Cited

U.S. PATENT DOCUMENTS 11,563,298 B2 * 1/2023 Travers .................. G02F 1/365

OTHER PUBLICATIONS

Bockstaele, R., et.al., "Microcavity LED-based parallel data link using small-diameter (125 μm) plastic optical fibres", Journal of Optics A: Pure and Applied Optics, vol. 1, No. 2, Mar. 1999, pp. 233-236.
Pezeshki, B. et. al., "Wide and parallel LED-based optical links using multi-core fiber for cip-to-chip communications", OFC 2021, pp. 1-3.
Wade, M. et.al., "TeraPHY: A Chiplet Technology for Low-Power, High-Bandwidth In-Package Optical I/O," IEEE Micro, 2020, vol. 40, No. 2, pp. 63-71.

* cited by examiner

OPTICAL FIBERS, OPTICAL FIBER ASSEMBLIES, AND OPTICAL CONNECTIONS HAVING AN ARRAY OF OPTICAL FIBERS

CROSS REFERENCE TO RELATED APPLICATIONS

This application claims the benefit of priority of U.S. Provisional Application Ser. No. 63/288,082 filed on Dec. 10, 2021, the content of which is relied upon and incorporated herein by reference in its entirety.

FIELD

The disclosure is directed to optical fiber assemblies and, more particularly, high-density optical fiber arrays for coupling to an array of active optical devices.

BACKGROUND

The growth rate of high performance computing, machine learning and artificial intelligence for new applications has exceeded the speed of Moore's Law. Disaggregation of computing functions such as processors, GPUs and memory has been a trend to scale up the computing power and better utilize the different update cycles of the computing resources. The interconnect distance between the disaggregated computing devices is a challenge for electrical interconnects and it is another ideal application for optical interconnects, which are insensitive to the transmission distance. However, the interconnects for disaggregated computing devices require very low power consumption, low latency and above all, low cost. Multiple parallel optical transceivers with moderate speed in simple non-return to zero (NRZ) format are well suited for such applications.

Low-cost optical interconnect solutions for coupling an array of optical fibers to an array of active optical devices of a transceiver are desired.

SUMMARY

In one embodiment, an optical fiber includes an inner core having a core refractive index delta and profile shape parameter $\alpha$ in the range of 1.8 to 2.6, including endpoints, and a cladding layer surrounding the inner core. The cladding layer includes an inner cladding segment having an inner refractive index delta, a trench segment having a trench refractive index delta, and an outer cladding segment having an outer refractive index delta. The optical fiber further includes a coating layer surrounding the cladding layer and having a thickness of less than 30 µm and a modulus greater than or equal to 0.5 GPa.

In another embodiment, an optical fiber assembly includes a plurality of optical fibers having an end and a connector housing having a front face and an inner cavity defining an opening at the front face. The plurality of optical fibers form a two-dimensional array at the end. Each optical fiber of the plurality of optical fibers contacts adjacent optical fibers of the plurality of optical fibers at the end. The plurality of optical fibers is disposed within the inner cavity such that the end of the plurality of optical fibers are exposed at the opening.

In yet another embodiment, an optical connection includes an array of light emitting diodes and an optical fiber assembly. The optical fiber assembly includes a plurality of optical fibers having an end and a connector housing having a front face and an inner cavity defining an opening at the front face. The plurality of optical fibers form a two-dimensional array at the end. Each optical fiber of the plurality of optical fibers contacts adjacent optical fibers of the plurality of optical fibers at the end. End faces of the plurality of optical fibers are coupled to the array of light emitting diodes. The plurality of optical fibers is disposed within the inner cavity such that the end of the plurality of optical fibers are exposed at the opening.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

References will now be made in detail to the embodiments of the disclosure, examples of which are illustrated in the accompanying drawings. Whenever possible, like reference numbers will be used to refer to like components or parts.

Disaggregated computing solutions relying on optical communication utilize optical interconnects. Optical interconnects are a costly component of the overall communication system because they require precise alignment to minimize signal loss. To further reduce the cost of chip-to-chip optical interconnects that have a typical transmission distance of less than 10 meters, multimode optical fiber may be a more preferable transmission media than single mode fibers. Although VCSEL arrays coupled to a standard 50 µm OM3/OM4 fiber array have been utilized, the VCSEL based ecosystem, which was developed for the transmission range of about 100 m, is not cost optimized for the much shorter chip-to-chip interconnector disaggregated computing applications. Furthermore, the use of a two-dimensional fiber array interface using a micro-hole array to position the fibers is too costly for high volume applications.

Micro-LED arrays are emerging as an attractive light source for short reach, high-density and low-cost optical interconnect applications in high performance computers and data centers. Because a micro-LED array has a few hundreds of LEDs that can be used as parallel transmitters, connecting each individual fiber to each individual LED is challenging. An imaging fiber bundle coupled to micro-LEDs may provide transmission at up to 10 Gb/s per channel; however, the imaging fiber bundle is rigid, and the fiber core is not optimized for capturing LED light. Moreover, the micro-LED array is not aligned and matched to the fiber core array, further reducing the optical efficiency.

Thus, there has been an unmet need for a novel optical fiber and low-cost two-dimensional optical fiber array with high density optical interfaces for micro-LED based highly scalable chip-to-chip optical interconnect applications. Embodiments of the present disclosure provide optimized optical fibers that are suitable for making arrays of optical fibers for optical interconnect applications using micro-LEDs. Low cost optical connector assemblies, optical connections, and high volume assembly methods for making the same are disclosed.

Various embodiments of optical fibers, optical fiber assemblies, and optical connections for chip-to-chip interconnections are described in detail below.

Figure 1:
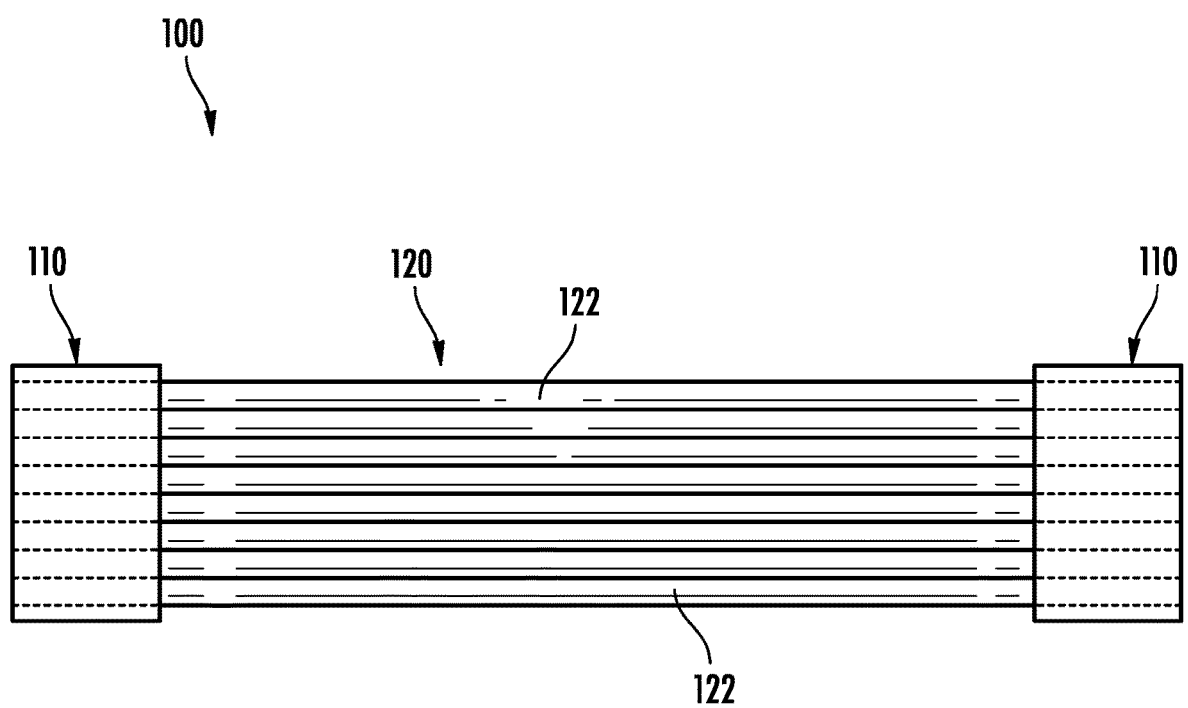
FIG. 1 illustrates an example optical fiber assembly according to one or more embodiments described and illustrated herein.

Referring now to FIG. 1, a side view of an example optical fiber assembly 100 is schematically illustrated. The optical fiber assembly 100 of the illustrated embodiment includes an array of optical fibers 120 having a plurality of individual optical fibers 122, and a connector housing 110 at each end of the array of optical fibers 120. The array of optical fibers 120 may include N number of optical fibers 122 that are arranged in a pattern that matches a light emitting diode (LED) array. At both ends of the array of optical fibers 120, the optical fibers 122 are attached together by the connector housings 110, and their end faces are polished. The connector housings 110 may be provided on the two ends of the array of optical fibers 120 for connecting the array of optical fibers 120 to the array of LEDs and/an array of photodiode receivers. The optical fibers 122 in the middle of the array of optical fibers 120 between the two end sections may be kept loose such that the array of optical fibers 120 is flexible for easy handling.

Figure 2A:
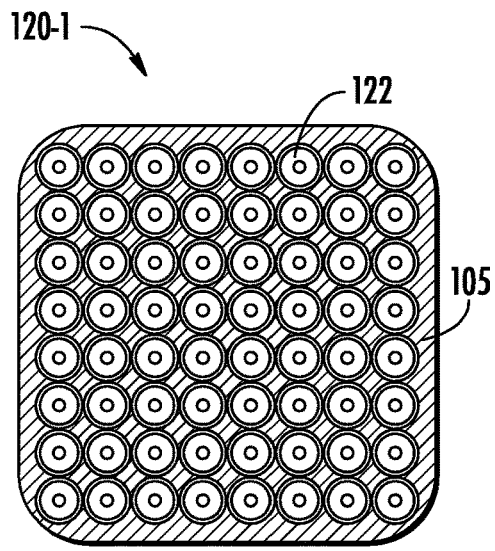
FIGS. 2A-2D illustrate example optical fiber array configurations according to one or more embodiments described and illustrated herein.
Figure 2B:
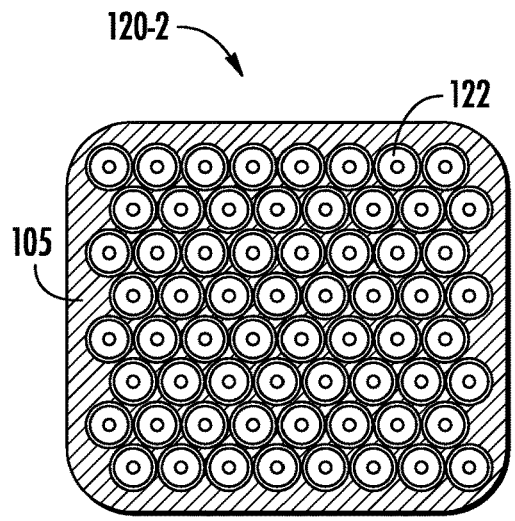
Figure 2C:
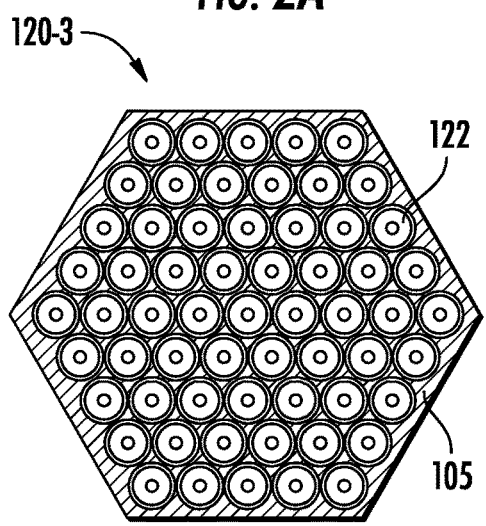
Figure 2D:
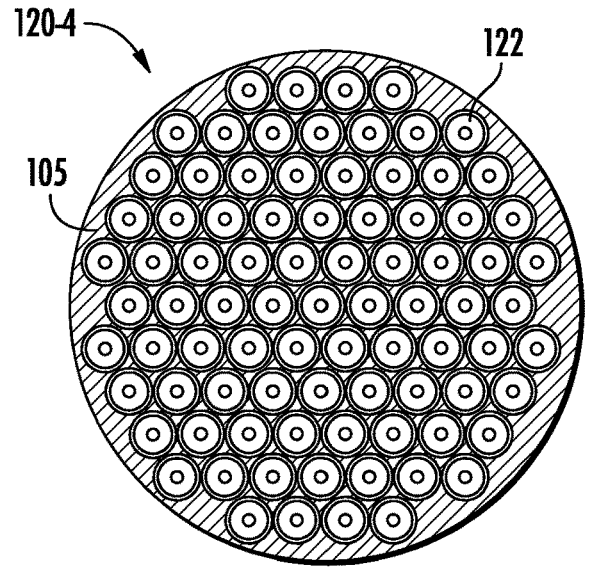

FIGS. 2A-2D show cross-sectional views of different fiber array arrangements. The ends of the individual optical fibers 120 are arranged in an array that corresponds with an of active optical devices, such as LEDs acting as transmitters or photodiodes acting as receivers. In FIG. 2A, the ends of the individual optical fibers 122 of an array of optical fibers 120-1 are arranged in a square shape with a square lattice. It is noted that in each of FIGS. 2A-2D, the optical fibers are maintained by adhesive 105, and that the connector housing is not shown. In FIG. 2B, the ends of the individual optical fibers 122 of an array of optical fibers 120-2 are arranged in a rectangular shape with triangular lattice. In FIG. 2C, the ends of the individual optical fibers 122 of an array of optical fibers 120-3 are arranged in a hexagonal shape with triangular lattice. In FIG. 2D, the ends of the individual optical fibers 122 of an array of optical fibers 120-3 are arranged in a round shape with triangular lattice. The number of optical fibers 120, N, is greater than or equal to 4, for example, without limitation, 4, 7, 16, 50, 64, 100, 144, 256.

Figure 2E:
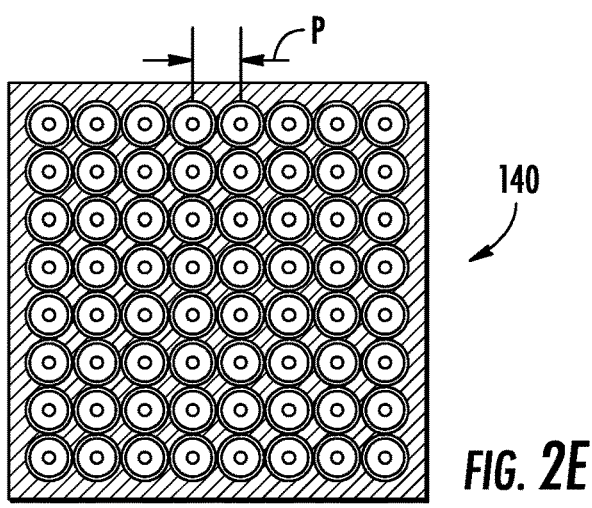
FIG. 2E illustrates an example array of active optical devices according to one or more embodiments described and illustrated herein.

FIG. 2E illustrates an array of active optical devices 140. Each active optical device 140 may be configured as a transmitter to transmit optical signals, such as a laser or an LED, and/or a receiver, such as a photodiode to detect optical signals. The individual active optical devices may be arranged in any pattern, such as those illustrated by FIGS. 2A-2D. An optical fiber assembly 100 optically coupled to an array of active optical devices 140 is referred to herein as an optical connection.

Figure 3A:
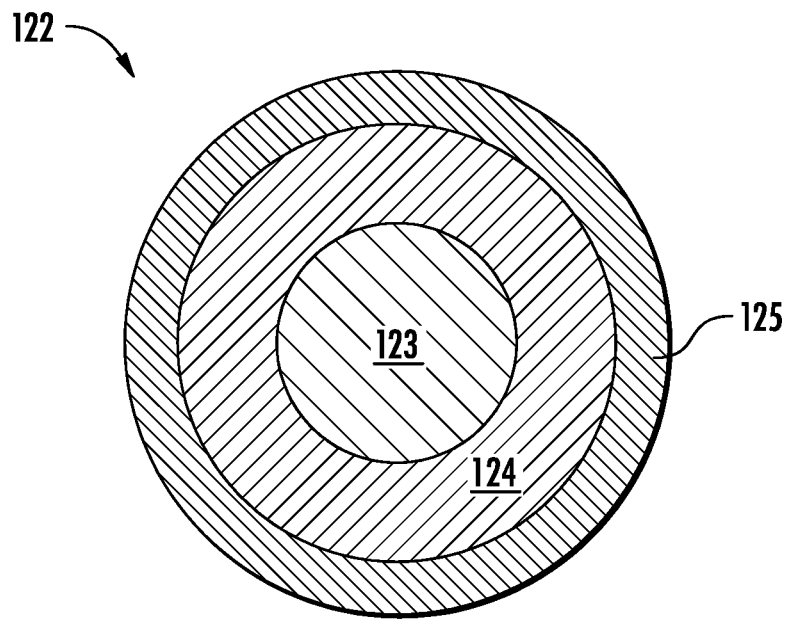
FIG. 3A illustrates a cross section of an example optical fiber according to one or more embodiments described and illustrated herein.
Figure 3B:
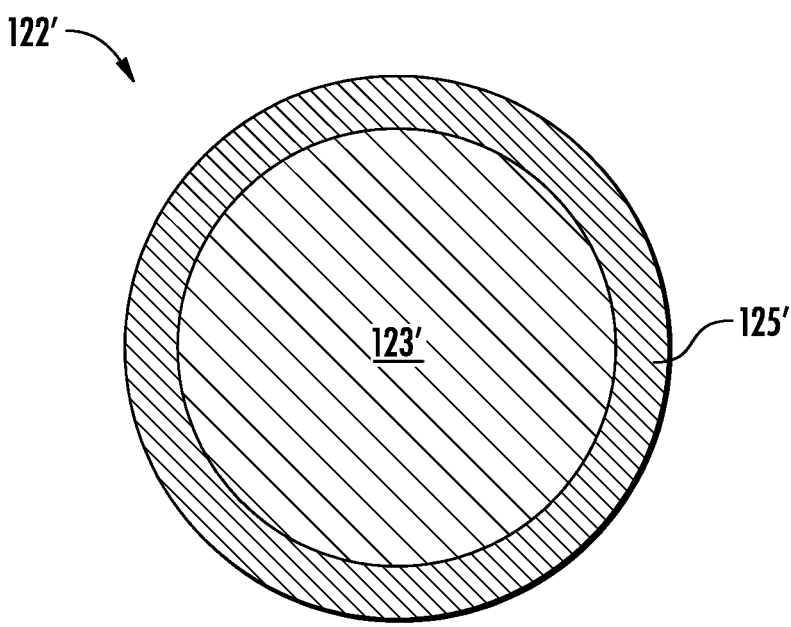
FIG. 3B illustrates a cross section of another example optical fiber according to one or more embodiments described and illustrated herein.

The optical fibers 122 may be made of fused silica. However, other materials may be used for the optical fibers 122. Referring now to FIG. 3A, the optical fibers 122 may include a core 123, a cladding layer 124, and a coating layer 125. The core 123 and the cladding layer 124 may be made of glass (e.g., fused silica), for example. The coating layer 125 may be made of a polymer. In other embodiments, as shown in FIG. 3B, the optical fibers 122 comprise a core 123' and a coating layer 125' when a low index polymer is used as the coating layer 125' such that the coating layer 125' serves as both a cladding layer and a coating layer.

The optical fibers 122 have a refractive index profile n(r) that enables them to be directly coupled to the array of active optical devices 140. The refractive index profile determines the fiber numerical aperture and core area that are related to the light capture capability of the fiber. The profile shape affects the modal bandwidth that is related to information transmission capacity. To describe the refractive index change in segment i in a profile, a more convenient way is to use the relative refractive index change $\Delta_i$, which is defined as $$\Delta_i(\%) = 100 \frac{n_i^2 - n_c^2}{n_i^2}$$

As used herein $n_i$ is the refractive index of segment i, $n_c$ is the average refractive index of undoped silica glass. As used herein, the relative refractive index is represented by $\Delta$, and its values are given in units of "%", unless otherwise specified. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. A relative refractive index profile $\Delta_i(r)$ can be described by an "α-profile" (also referred to as an "alpha profile") refers to a relative refractive index profile that has the following functional form:

$$\Delta_i(r) = \Delta_i(r_0)\left\{1 - \left[\frac{|r - r_0|}{(r_z - r_0)}\right]^\alpha\right\}$$

where $r_o$ is the point at which $\Delta_i(r)$ is maximum, $r_z$ is the point at which $\Delta_i(r)$ is zero, and r is in the range $r_i \leq r \leq r_f$, where $r_i$ is the initial point of the α-profile, $r_f$ is the final point of the α-profile, and a is the profile shape parameter that is a real number. When α=1, the profile has a triangular profile; when α=1, the profile has a parabolic shape; and when α is infinity, the profile becomes a perfect step shape. In some embodiments, examples shown herein can have a core alpha of 1≤α≥100. In practice, an actual optical fiber, even when the target profile is a perfect alpha profile, some level of deviation from the ideal configuration can occur. Therefore, the alpha parameter for an optical fiber may be obtained from a best fit of the measured index profile, as is known in the art.

Figure 4:
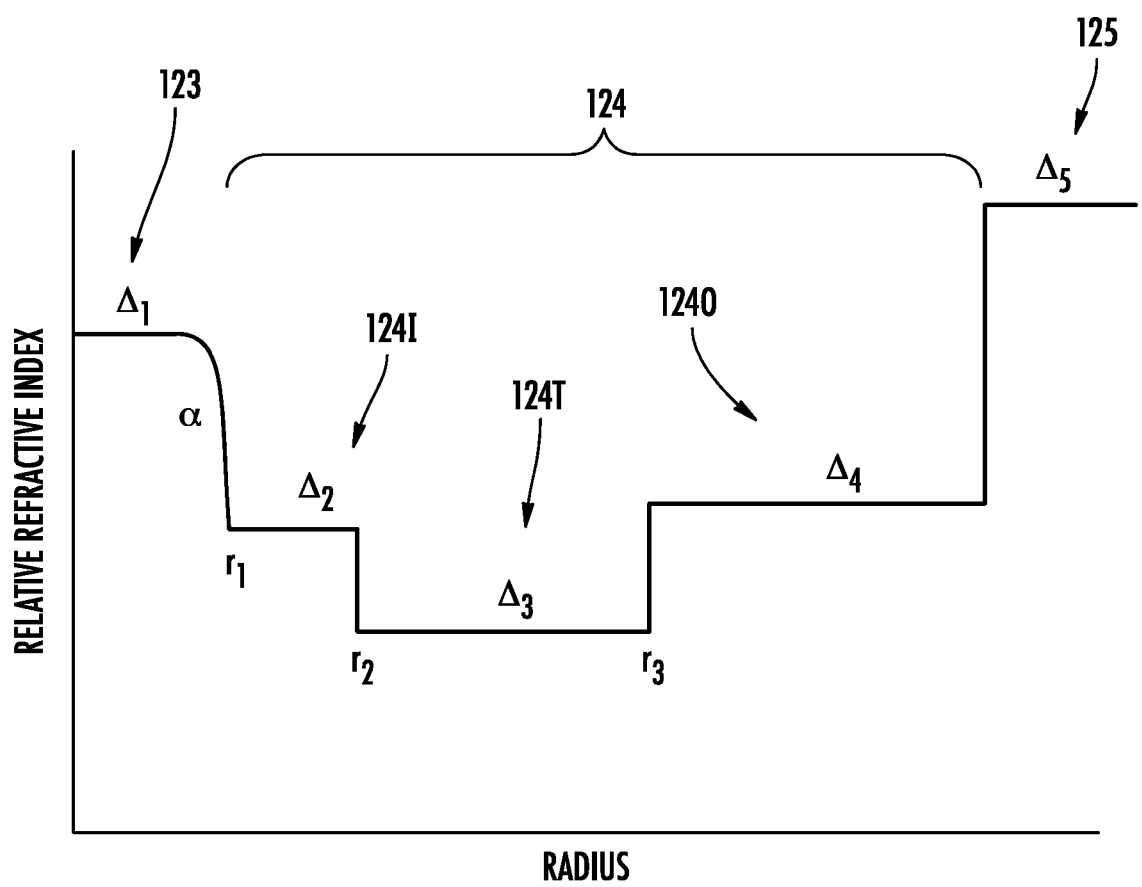
FIG. 4 illustrates an example index profile of an example optical fiber according to one or more embodiments described and illustrated herein.

FIG. 4 illustrates an example, non-limiting refractive index profile of the optical fibers 122. The core 123 may have profile shape parameter α in the range of 1 to 2000. When the profile shape parameter α parameter is greater than 20, the refractive index profile is essentially a step index profile. For high bandwidth, the profile shape parameter α may be around 2, for example between 1.8 to 2.6 depending on the operating wavelength. The core 123 has a core refractive index delta $\Delta_1$ and a radius $r_1$. The optical fibers 122 may have a modal dispersion bandwidth greater than 1 GHz·km at the operating wavelengths. As a non-limiting example, the optical fibers may have a transmission wavelength within a range of 400 nm to 900 nm, including endpoints.

To improve optical fiber bending loss, the cladding layer 124 may include a low index trench. In the example illustrated by FIG. 4, the cladding layer 124 comprises an inner cladding segment 124I, a trench segment 124T, and an outer cladding segment 124O. The inner cladding segment 124I has an inner refractive index delta $\Delta_2$. The trench segment 124T has a trench refractive index delta $\Delta_3$. The outer cladding segment 124O has an outer refractive index delta $\Delta_4$.

The coating layer 125 has a coating refractive index delta $\Delta_5$. The coating layer 125 may have a higher refractive index than the core 123; however, a polymer material with a refractive index lower than the core 123 may be used. In this case, the optical fiber 122' may have only the core 123' and the coating layer 125' without the cladding layer, as shown in FIG. 3B. In such an embodiment, the coating layer 125' serves as a cladding layer.

Still referring to FIG. 4, the maximum index of the core $\Delta_1$ is greater than the outer refractive index delta $\Delta_4$. As a non-limiting example, the relative refractive index of the core to the cladding $\Delta_1$ is between 0% and 3%. In some embodiments, the core 123 may be doped with germanium or pure silica. The core radius $r_1$ may be selected in the range of 10 to 62.5 μm, including endpoints. The low-index trench segment 124T may have a trench refractive index delta Δ in the range of −1% to −0.1% (including endpoints), and a width $w=r_3-r_2$ in the range of 2 to 10 μm (including endpoints). Radius $r_2$ is the radius from the center of the core 123 to the beginning of the trench segment 124T. Radius $r_3$ is the radius form the center of the 123 to the beginning of the outer cladding segment 124O.

As a non-limiting example, the trench segment 124T may be made of silica doped with fluorine, or boron, or co-doped with both fluorine and boron. The trench segment 124T can be offset by a distance $d=r_2-r_1$ from the core, where the offset distance d is between 0 to 5 μm, including endpoints.

The inner refractive index delta $\Delta_2$ and the outer cladding refractive index $\Delta_4$ may be the same or different. As an example and not a limitation, the fiber diameter may be equal to or less than 125 μm, for example, 125, 100, 80, 60, 50, 30 μm. As a non-limiting example, the thickness of the coating layer 125 may be between 1 and 30 μm, including endpoints. For low index polymer coating, a coating relative refractive index $\Delta_5$ may be between −0.3 to −15%, including endpoints.

Because of the short transmission distance of typical applications, only a single layer of polymer coating may be applied on the fiber; however, multiple polymer coatings may be used. In one non-limiting example, the optical fiber 122 has a cladding layer diameter of 125 μm, and a coating diameter of 150 μm. The coating has mechanical properties similar to that of the secondary coating in standard two layer fiber coating with modulus greater than or equal to 0.5 GPa.

In embodiments, the optical fiber 122 has a coating layer that has a tightly controlled outer diameter and concentricity that are comparable to that of glass cladding. As such, the precise overall diameter of the optical fibers 122 provide accurate placement of them when arranged in a stacked array, thereby removing the need for precise and expensive reference features. Single layer thin-coated single mode fiber with a 125 μm coating diameter has been shown to have low random mate insertion loss when directly assembled into single mode ceramic ferrules without stripping off the coating. As examples, the optical fibers 122 described herein have a coating layer 125 with a thickness uniformity about a circumference of the cladding layer that is at least 1 μm and an overall diameter tolerance of ±0.5 μm.

Table 1 below provides eight example optical fibers that were modeled.

|  | Example 1 | Example 2 | Example 3 | Example 4 | Example 5 | Example 6 | Example 7 | Example 8 |
|---|---|---|---|---|---|---|---|---|
| Core delta $\Delta_1$ (%) | 1 | 1 | 1 | 1 | 2 | 1 | 0 | 1 |
| Core radius $r_1$ (μm) | 25 | 25 | 50 | 50 | 31.5 | 20 | 20 | 20 |
| Profile parameter α | 2.1 | 2.2 | 2.2 | 2.2 | 2.2 | 2.5 | 2000 | 2.5 |
| Inner clad delta $\Delta_2$ (%) | 0 | 0 | 0 | 0 | 0 | na | na | na |
| Inner clad radius $r_2$ (μm) | 26.4 | 26.4 | 52.8 | 62.5 | 62.5 | na | na | na |
| Trench delta $\Delta_3$ (%) | −0.4 | −0.4 | −0.4 | na | na | −0.4 | na | na |
| Trench radius $r_3$ (μm) | 31.5 | 31.5 | 62.5 | na | na | 25 | na | na |
| Outer clad delta $\Delta_4$ (%) | 0 | 0 | na | na | na | na | na | na |
| Outer clad radius $r_4$ (μm) | 62.5 | 62.5 | na | na | na | na | na | na |

|  | Example 1 | Example 2 | Example 3 | Example 4 | Example 5 | Example 6 | Example 7 | Example 8 |
|---|---|---|---|---|---|---|---|---|
| Coating $\Delta_c$ (%) | na | na | na | na | −na | na | −15 | −15 |
| Coating radius $r_c$ (μm) | 70 | 70 | 70 | 70 | 70 | 30 | 25 | 25 |
| Numerical aperture | 0.2 | 0.2 | 0.2 | 0.2 | 0.3 | 0.2 | 0.79 | 0.82 |
| Peak wavelength (nm) | 850 | 630 | 630 | 630 | 630 | 420 | 420 | 420 |
| Bandwidth | >1 GHz·km | >1 GHz·km | >1 GHz·km | >1 GHz·km | >1 GHz·km | >1 GHz·km | >4 MHz·km | >5 MHz·km |

In the examples in Table 1, the optical fibers have large core radii ranging from 20 to 50 μm, and high numerical apertures ranging from 0.2 to 0.82, which enable high light capture efficiency. The peak wavelength can be designed from 400 nm to 900 nm to allow different micro-LED sources at different wavelengths. For optical fibers with glass cladding as in Examples 1-6, the refractive index profile in the core is graded profile with a profile shape parameter α around 2 to optimize the bandwidth. The bandwidth is greater than 1 GHz,km, which is suitable for high data rate transmission over short distances. However, for some applications with very short lengths and low data rates, a step index profile design may be used with a bandwidth about a few MHz·km. For the optical fibers with polymer cladding in Examples 7-8, the bandwidth is about 4-5 MHz·km because the index profile is essentially a step index profile.

The ends of the optical fibers 122 may be stacked into an array to form an array of optical fibers 120, such as shown in FIGS. 2A-2D, for example. The end of the array of optical fibers 120 may be assembled using a ferrule or a face plate with an array of precision micro holes to position each of the fiber with stripped coating. However, the stripping process may introduce mechanical failure modes in the optical fibers. Further, the use of a precision micro hole array also increases the component and assembly cost.

In embodiments of the present disclosure, the requirement for a precisions micro hole array is eliminated (although it may still be used if desired) by tightly controlled tolerances on the optical fibers 122. Because of the tightly controlled tolerances, the individual optical fibers may be stacked on one another to precisely locate the end faces of the optical fibers in the vertical and lateral directions on the end face of the array of optical fibers 120.

Figure 5:
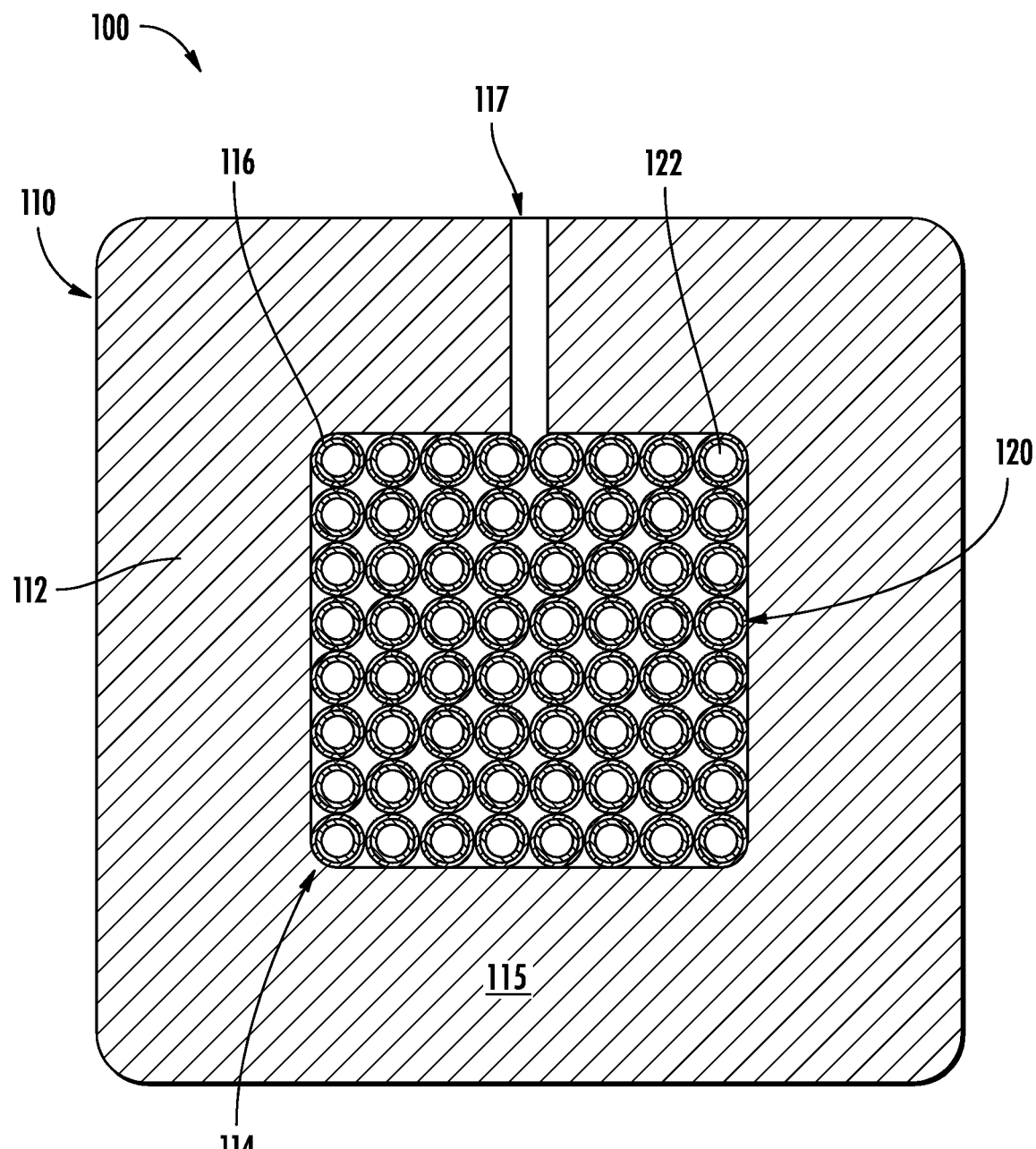
FIG. 5 illustrates a front elevation view of an example optical fiber assembly according to one or more embodiments described and illustrated herein.
Figure 6:
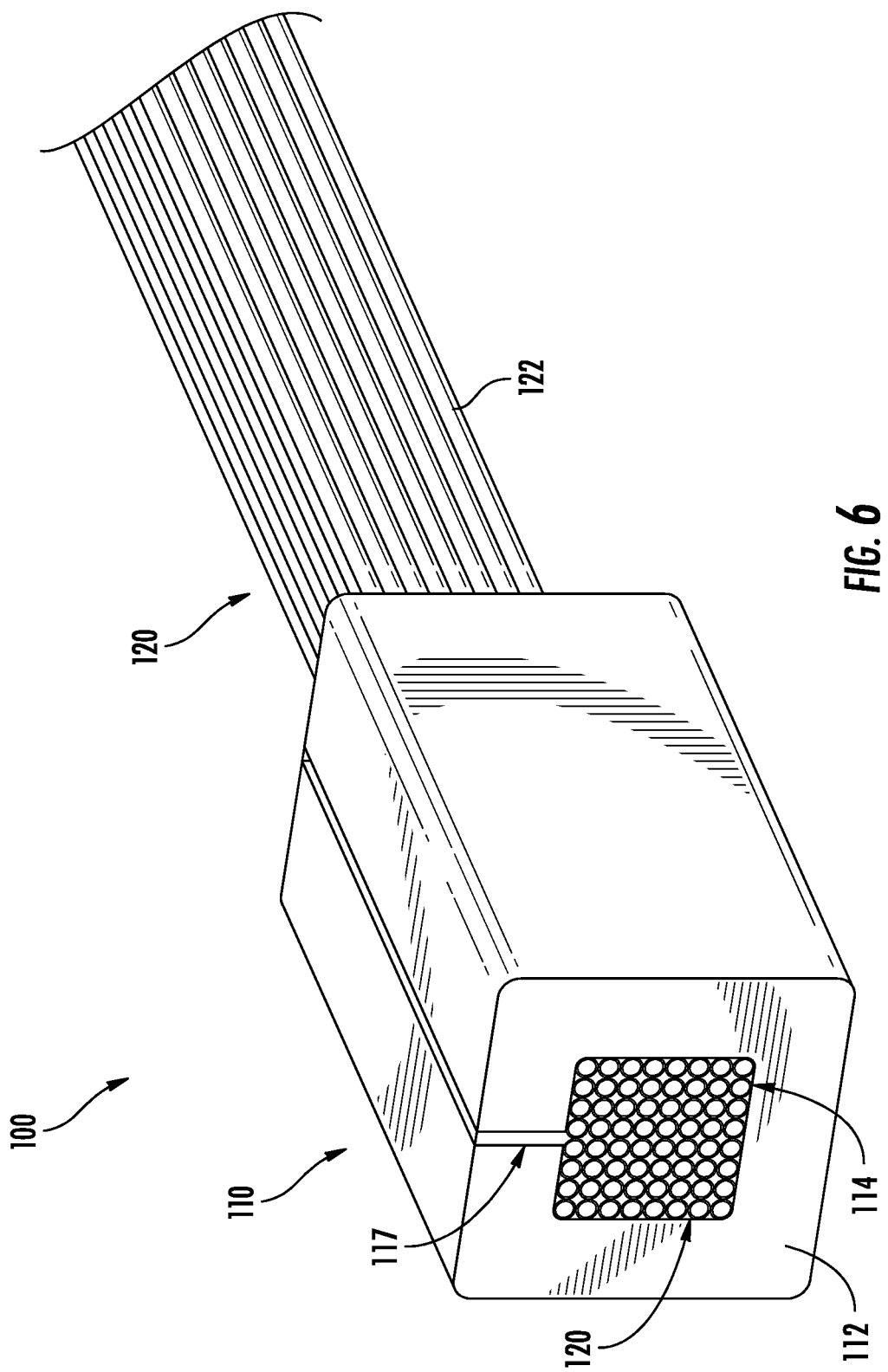
FIG. 6 illustrates a perspective view of the example optical fiber assembly illustrated by FIG. 5 according to one or more embodiments described and illustrated herein.

FIGS. 5 and 6 illustrate a non-limiting example of an optical fiber assembly 100 wherein 8×8 multimode optical fibers 122 are stacked without stripping off their respective coating layers at the optical interface (i.e., the end face of the optical fibers 122). In this example, the multimode fiber has a core diameter of 100 μm, cladding layer diameter of 125 μm, and coating layer diameter of 150±0.5 μm. The coating thickness uniformity around the circumference is better than 0.5 μm. The optical fibers 120 may be randomly selected from different spools in different locations so that the fiber coating diameters are randomized.

As shown in FIGS. 5 and 6, the optical fiber assembly 100 includes a connector housing 110. With a coating layer diameter of 150 μm, the connector housing 110 has an inner cavity 114 with a dimension of 1204 μm×1204 μm. This size accommodates the closely stacked optical fibers 122 defining the array of optical fibers 120 even when all the optical fibers 120 are at the high end of tolerance distribution. The inner cavity 114 may have rounded corners having a radius that substantially matched or slightly smaller than the radius of the optical fibers 122. There may be a clearance (e.g., 4 μm) to allow easy insertion of the array of optical fibers 120. The connector housing 110 may also be heated (e.g., to about 100° C.) to facilitate the insertion of the array of optical fibers 120.

Because multimode optical fibers have a large alignment tolerance of ±15 μm, the stacked array of optical fibers 120 meets the precision requirement without using a micro hole for each individual optical fiber 120. This tolerance also can accommodate the additional positioning tolerance of a typical pick-and-place machine for assembling the array of active optical devices 140. Because the coating layers are not stripped, the optical fibers maintain pristine condition for reliability.

The connector housing 110 can be made by any suitable method, such as, without limitation, precision injection molding, precision metal stamping, or machining methods such as wire electrical discharge machining (EDM). As non-limiting examples, the material can be glass filled PPS for injection molding, or stainless steel or other metals for machining or stamping. All these materials can obtain a dimensional tolerance of better than ±2 μm. Considering the wide variety of fiber bundle configurations, wire EDM is a practical method to manufacture the connector housing 110. The width of the wire may be preferably smaller than the diameter of the optical fiber 122. In this example, a wire width of 100 μm may be used. The longitudinal slit 117 is centered relative to the edge of an optical fiber 122, so that the optical fibers 122 that are adjacent to the longitudinal slit 137 are still confined in position. It should be understood that embodiments may not have the longitudinal slit 117 where the connector housing 110 is not fabricated by wire EDM.

The array of optical fibers 120 may be secured within the inner cavity 114 of the connector housing 110 by an adhesive 105, such as epoxy (see FIGS. 2A-2D illustrating the adhesive 105). The adhesive 105 preferably has low shrinkage, high modulus, and low coefficient of thermal expansion. The adhesive 105 also fills the longitudinal slit 117, if present. The outer surface of connector housing 110 may be masked during the adhesive application process so that it maintains clean. In this example of FIGS. 5 and 6, the outer dimension of the housing is 2400 μm×2400 μm.

The end face of the connector housing 110 may be diced using a diamond wire saw, which leaves a near polished front face 115 for mating with an array of active optical devices 140. In some embodiments, a short final polishing process is used to complete the front face 115.

The array of optical fibers 120 may be loose optical fibers 122 for optimum bending flexibility and reliability of the array 120. Comparing to imaging fiber, which has a glass diameter at least 0.5 mm, each optical fiber 122 in the array of optical fibers 120 is not mechanically coupled to one another, thus retaining the same bending flexibility and reliability of an individual optical fiber 122. In an alternative embodiment, the optical fibers 120 may be ribbonized in a one-dimensional array.

In a fiber bundle jumper, such as the optical fiber assembly 100 of FIGS. 1, 5 and 6, it may be important for each individual optical fiber 122 to be located in the same coordinate on both ends of the fiber bundle jumper without crossing positions. With a one-dimensional ribbon this process is straightforward. However, when using loose optical fibers 122, there is a higher probability of fiber crossing.

Figure 7:
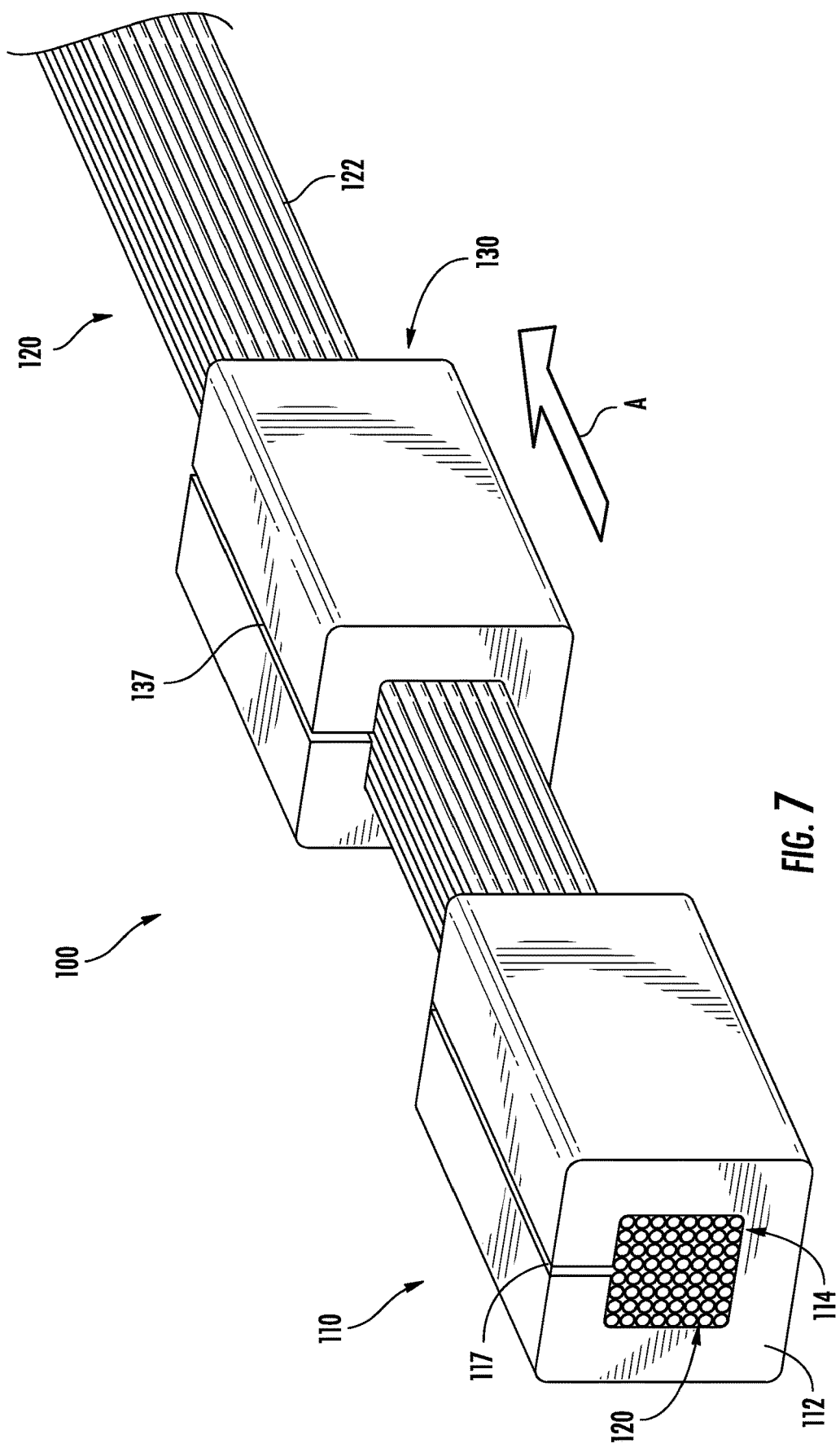
FIG. 7 illustrates a perspective view showing an example method of assembling an optical fiber assembly according to one or more embodiments described and illustrated herein.
Figure 8:
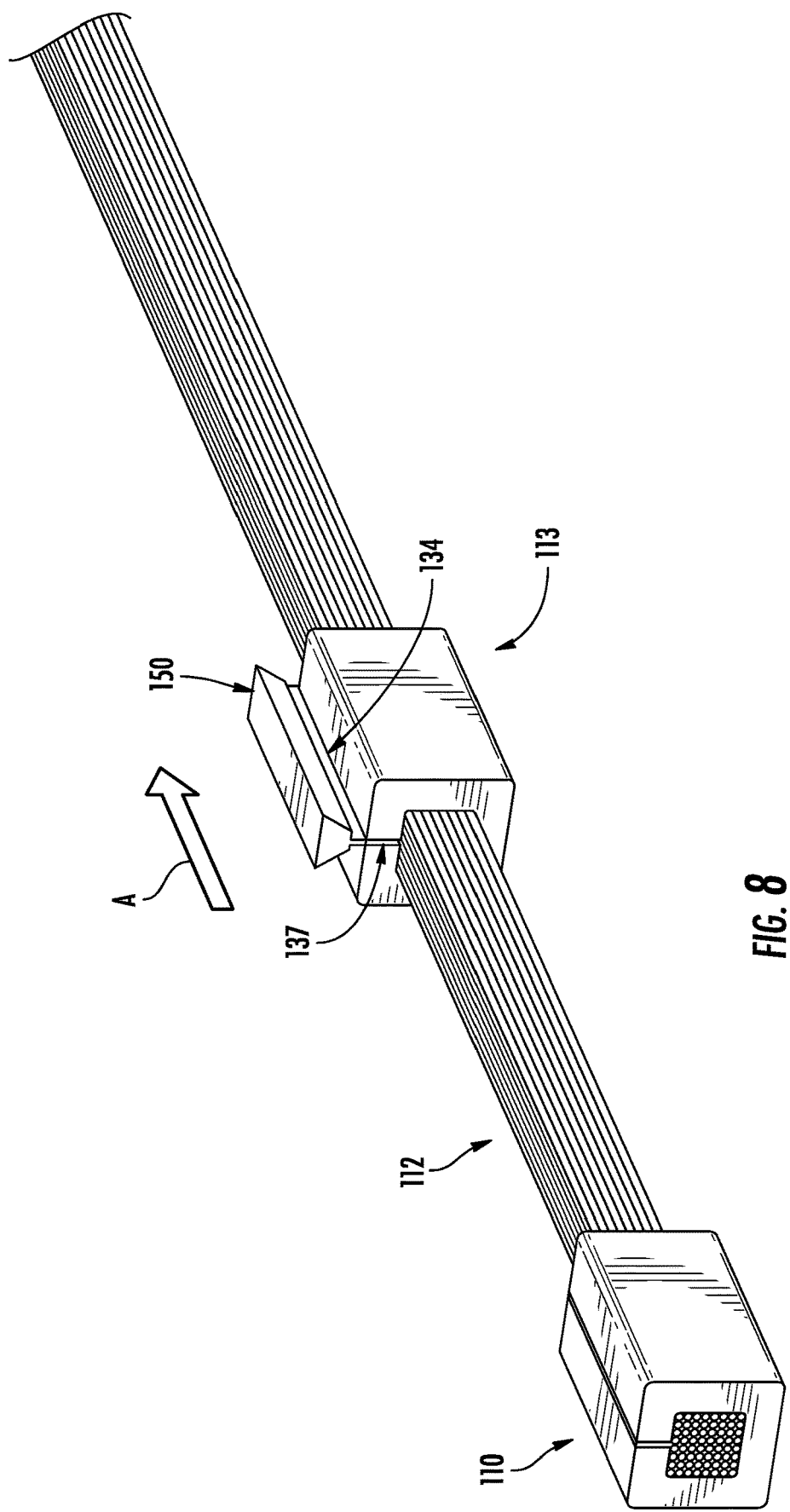
FIG. 8 illustrates a perspective view showing another example method of assembling an optical fiber assembly according to one or more embodiments described and illustrated herein.

FIG. 7 an example to maintain the coherence of the loose optical fibers 122 at both ends of the array of optical fibers 120, as well as a consistent fiber length across the array of optical fibers 120. In the example of FIG. 7, a second connector housing 130 is placed closely behind the first connector housing 110 during fiber insertion. In such a short distance, the array of optical fibers 120 maintains position coherence. Once the array of optical fibers 120 has been bonded to the first connector housing 110, the second connector housing 130 is slide back away from the first connector housing 110 in direction as indicated by arrow A. The entry slit 137 may be slightly wedged open (e.g., about 50 μm) to reduce the friction but without allowing the optical fibers 122 to cross positions. FIG. 8 illustrates an example wedge tool 150 that may be inserted into the entry slit 137 of the second connector housing 130. The array of optical fibers 120 may be held vertically to prevent tangling of the optical fibers 122. Once the second housing 130 slides to the desired length, the wedge is removed, and the array of optical fibers 120 may be bonded to the second connector housing 130, which completes the optical fiber assembly as shown in FIG. 1 (note that both the first connector housing and the second connector housing are indicated by reference numeral 110 in FIG. 1 because they may be identical components).

The optical fiber assemblies 100 described herein may be used for micro-LED based transceivers with direct coupling or through micro-lens arrays. Anti-reflective coatings may be applied to the end faces of the of the array of optical fibers 120. Additional fastening mechanisms can be designed into the connector housing 110 for mating to the on chip interface.

The array of optical fibers 120 can be protected by a wraparound cable jacket (not shown) after the termination process in some embodiments. Breakout assemblies can also be made with a similar process for chip to multi-chip connectivity.

There are many variations of the embodiments described herein. For example, the individual optical fibers 122 and the array of optical fibers 120 may be coupled to VCSEL based co-packaged optics for fiber to server applications. In this case, the smaller diameter fiber coating improves the density considerably in comparison with conventional solution using 250 μm fiber pitch. The other end of the fiber bundle can be terminated by MTP connectors for example.

In a first aspect, an optical fiber includes an inner core having a core refractive index delta and profile shape parameter α in the range of 1.8 to 2.6, including endpoints. The optical fiber further includes a cladding layer surrounding the inner core. The cladding layer includes an inner cladding segment having an inner refractive index delta, a trench segment having a trench refractive index delta, and an outer cladding segment having an outer refractive index delta. The optical fiber further includes a coating layer surrounding the cladding layer, the coating layer having a thickness of less than 30 μm and a modulus greater than or equal to 0.5 GPa.

In a second aspect, an optical fiber according to the first aspect, wherein the optical fiber has a transmission wavelength within a range of 400 nm to 900 nm, including endpoints.

In a third aspect, an optical fiber according to the second aspect, wherein the optical fiber has a modal bandwidth of greater than or equal to 1 Ghz·km at the transmission wavelength.

In a fourth aspect, an optical fiber according to any preceding aspect, wherein the coating layer is a polymer.

In a fifth aspect, an optical fiber according to any preceding aspect, wherein the coating layer has a thickness uniformity about a circumference of the cladding layer that is at least 1 μm.

In a sixth aspect, an optical fiber according to the fifth aspect, wherein the coating layer has an overall diameter tolerance of +0.5 μm.

In a seventh aspect, an optical fiber according to any preceding aspect, wherein the core refractive index delta is greater than the outer refractive index delta of the cladding layer.

In an eighth aspect, an optical fiber according to any preceding aspect, wherein a relative refractive index between the core refractive index delta to the inner refractive index delta of the cladding layer is within a range of 0% to 3%, including endpoints.

In a ninth aspect, an optical fiber according to any preceding aspect, wherein the trench refractive index delta is within a range of −1% to −0.1%.

In a tenth aspect, an optical fiber according to any preceding aspect, wherein the trench segment has a width within a range of 2 to 10 μm, including endpoints.

In an eleventh aspect, an optical fiber according to any preceding aspect, wherein the trench segment is offset from a central location of the inner core by a distance d within a range of 0 to 5 μm.

In a twelfth aspect, an optical fiber assembly includes a plurality of optical fibers having an end and a connector housing having a front face and an inner cavity defining an opening at the front face. The plurality of optical fibers form a two-dimensional array at the end. The plurality of optical fibers form a two-dimensional array at the end. Each optical fiber of the plurality of optical fibers contact adjacent optical fibers of the plurality of optical fibers at the end. The plurality of optical fibers is disposed within the inner cavity such that the end of the plurality of optical fibers are exposed at the opening.

In a thirteenth aspect, an optical fiber assembly according to the twelfth aspect, wherein each optical fiber includes an inner core and a cladding layer surrounding the inner core. The inner core has a core refractive index delta and profile shape parameter α in the range of 1.8 to 2.6, including endpoints. The cladding layer includes an inner cladding segment having an inner refractive index delta, a trench segment having a trench refractive index delta, and an outer cladding segment having an outer refractive index delta.

In a fourteenth aspect, the optical fiber assembly of the thirteenth aspect, wherein each optical fiber further comprises a coating layer surrounding the cladding layer, the coating layer having a thickness of less than 30 μm and a modulus greater than or equal to 0.5 GPa.

In a fifteenth aspect, the optical fiber assembly of the fourteenth aspect, wherein the coating layer is a polymer.

In a sixteenth aspect, the optical fiber assembly of the fourteenth or fifteenth aspects, wherein the coating layer has a thickness uniformity about a circumference of the cladding layer that is at least 1 μm.

In a seventeenth aspect, the optical fiber assembly of the sixteenth aspect, wherein the coating layer has an overall diameter tolerance of ±0.5 μm.

In an eighteenth aspect, the optical fiber assembly of any one of the thirteenth through seventeenth aspects, wherein the optical fiber has a transmission wavelength within a range of 400 nm to 900 nm, including endpoints.

In a nineteenth aspect, the optical fiber assembly according to the eighteenth aspect, wherein the optical fiber has a modal dispersion bandwidth of greater than or equal to 1 Ghz·km at the transmission wavelength.

In a twentieth aspect, the optical fiber assembly of any one of the thirteenth through nineteenth aspects, wherein the core refractive index delta is greater than the outer refractive index delta of the cladding layer.

In a twenty-first aspect, the optical fiber assembly of any one of the thirteenth through twentieth aspects, wherein a relative refractive index between the core refractive index delta to the inner refractive index delta of the cladding layer is within a range of 0% to 3%, including endpoints.

In a twenty-second aspect, the optical fiber assembly of any one of the thirteenth through twenty-first aspects, wherein the trench refractive index delta is within a range of −1% to −0.1%.

In twenty-third aspect, the optical fiber assembly of any one of the thirteenth through twenty-second aspects, wherein the trench segment has a width within a range of 2 to 10 μm, including endpoints.

In a twenty-fourth aspect, the optical fiber assembly of any one of the thirteenth through twenty-third aspects, wherein the trench segment is offset from a central location of the inner core by a distance d within a range of 0 to 5 μm.

In a twenty-fifth aspect, the optical fiber assembly of any one of the thirteenth through twenty-fourth aspects, wherein the inner cavity has a plurality of corners, each corner having a radius substantially equal to a radius of an individual optical fiber of the plurality of optical fibers.

In a twenty-sixth aspect, the optical fiber assembly of any one of the thirteenth through twenty-fifth aspects, wherein the connector housing further comprises a longitudinal slit extending from a surface of the connector housing to the inner cavity.

In a twenty-seventh aspect, the optical fiber assembly of the twenty-sixth aspect, further including a wedge tool operable to be inserted into the longitudinal slit.

In a twenty-eighth aspect, an optical connection includes an array of light emitting diodes and an optical fiber assembly. The optical fiber assembly includes a plurality of optical fibers having an end and a connector housing having a front face and an inner cavity defining an opening at the front face. The plurality of optical fibers form a two-dimensional array at the end. The plurality of optical fibers form a two-dimensional array at the end. Each optical fiber of the plurality of optical fibers contact adjacent optical fibers of the plurality of optical fibers at the end. End faces of the plurality of optical fibers are coupled to the array of light emitting diodes. The plurality of optical fibers is disposed within the inner cavity such that the end of the plurality of optical fibers are exposed at the opening.

In a twenty-ninth aspect, the optical connection of the twenty-eighth aspect, wherein each optical fiber includes an inner core and a cladding layer surrounding the inner core. The inner core has a core refractive index delta and profile shape parameter α in the range of 1.8 to 2.6, including endpoints. The cladding layer includes an inner cladding segment having an inner refractive index delta, a trench segment having a trench refractive index delta, and an outer cladding segment having an outer refractive index delta.

In a thirtieth aspect, the optical connection of the twenty-ninth aspect, wherein each optical fiber further includes a coating layer surrounding the cladding layer, the coating layer having a thickness of less than 30 μm and a modulus greater than or equal to 0.5 GPa.

In a thirty-first aspect, the optical connection of the thirtieth aspect, wherein the coating layer is a polymer.

In a thirty-second aspect, the optical connection of the thirtieth aspect or the thirty-first aspect, wherein the coating layer has a thickness uniformity about a circumference of the cladding layer that is at least 1 μm.

In a thirty-third aspect, the optical connection of the thirty-second aspect, wherein the coating layer has an overall diameter tolerance of ±0.5 μm.

In a thirty-fourth aspect, the optical connection of any one of the twenty-ninth through thirty-third aspects, wherein the core refractive index delta is greater than the outer refractive index delta of the cladding layer.

In a thirty-fifth aspect, the optical connection of any one of the twenty-ninth through thirty-fourth aspects, wherein a relative refractive index between the core refractive index delta to the inner refractive index delta of the cladding layer is within a range of 0% to 3%, including endpoints.

In a thirty-sixth aspect, the optical connection of any one of the twenty-ninth through thirty-fifth aspects, wherein the trench refractive index delta is within a range of −1% to −0.1%.

In a thirty-seventh aspect, the optical connection of any one of the twenty-ninth through thirty-sixth aspects, wherein the trench segment has a width within a range of 2 to 10 μm, including endpoints.

In a thirty-eighth aspect, the optical connection of any one of the twenty-ninth through thirty-seventh aspects, wherein the trench segment is offset from a central location of the inner core by a distance d within a range of 0 to 5 μm.

In a thirty-ninth aspect, the optical connection of any one of the twenty-ninth through thirty-eighth aspects, wherein individual light emitting diodes of the array of light emitting diodes have a transmission wavelength within a range of 400 nm to 900 nm, including endpoints.

In a fortieth aspect, the optical connection of any one of the twenty-ninth through thirty-ninth aspects, wherein the array of light emitting diodes includes an array of micro light emitting diodes.

In a forty-first aspect, the optical connection of the fortieth aspect, wherein a pitch of the array of light emitting diodes is less than or equal to 250 μm.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. An optical fiber comprising:
   an inner core made of glass and having a core refractive index delta, and a profile shape parameter α in the range of 1.8 to 2.6, including endpoints;
   a cladding layer surrounding the inner core, the cladding layer comprising:
      an inner cladding segment having an inner refractive index delta;
      a trench segment having a trench refractive index delta; and
      an outer cladding segment having an outer refractive index delta; and
   a coating layer surrounding the cladding layer, the coating layer having a thickness of less than 30 μm and a modulus greater than or equal to 0.5 GPa and the coating layer has an overall diameter tolerance of +0.5 μm.

2. The optical fiber of claim 1, wherein the optical fiber has a transmission wavelength within a range of 400 nm to 900 nm, including endpoints.

3. The optical fiber of claim 2, wherein the optical fiber has a modal dispersion bandwidth of greater than or equal to 1 Ghz·km at the transmission wavelength.

4. The optical fiber of claim 1, wherein the coating layer is a polymer.

5. The optical fiber of claim 1, wherein the coating layer has a thickness uniformity about a circumference of the cladding layer that is at least 1 μm.

6. The optical fiber of claim 1, wherein the core refractive index delta is greater than the outer refractive index delta of the cladding layer.

7. The optical fiber of claim 1, wherein a relative refractive index between the core refractive index delta to the inner refractive index delta of the cladding layer is within a range of 0% to 3%, including endpoints.

8. The optical fiber of claim 1, wherein the trench refractive index delta is within a range of −1% to −0.1%.

9. The optical fiber of claim 1, wherein the trench segment has a width within a range of 2 to 10 μm, including endpoints.

10. The optical fiber of claim 1, wherein the trench segment is offset from a central location of the inner core by a distance d within a range of 0 to 5 μm.

11. An optical fiber assembly comprising:
   a plurality of optical fibers each having an end, wherein:
      the plurality of optical fibers each comprising an inner core made of glass and form a two-dimensional array at the end; and
      each optical fiber of the plurality of optical fibers contact adjacent optical fibers of the plurality of optical fibers at the end;
   a connector housing comprising a front face and an inner cavity defining an opening at the front face, wherein the plurality of optical fibers is disposed within the inner cavity such that the end of the plurality of optical fibers are exposed at the opening, wherein the connector housing further comprises a longitudinal slit extending from a surface of the connector housing to the inner cavity.

12. The optical fiber assembly of claim 11, wherein each optical fiber comprises:
   an inner core having a core refractive index delta and profile shape parameter α in the range of 1.8 to 2.6, including endpoints; and
   a cladding layer surrounding the inner core, the cladding layer comprising:
      an inner cladding segment having an inner refractive index delta;
      a trench segment having a trench refractive index delta; and
      an outer cladding segment having an outer refractive index delta.

13. The optical fiber assembly of claim 12, wherein each optical fiber further comprises a coating layer surrounding the cladding layer, the coating layer having a thickness of less than 30 μm and a modulus greater than or equal to 0.5 GPa.

14. The optical fiber assembly of claim 13, wherein the coating layer is a polymer.

15. The optical fiber assembly of claim 13, wherein the coating layer has a thickness uniformity about a circumference of the cladding layer that is less than 1 μm.

16. The optical fiber assembly of claim 15, wherein the coating layer has an overall diameter tolerance of ±0.5 μm.

17. The optical fiber assembly of claim 12, wherein the optical fiber has a transmission wavelength within a range of 400 nm to 900 nm, including endpoints.

18. The optical fiber assembly of claim 17, wherein the optical fiber has a modal dispersion bandwidth of greater than or equal to 1 Ghz·km at the transmission wavelength.

19. The optical fiber assembly of claim 12, wherein the core refractive index delta is greater than the outer refractive index delta of the cladding layer.

20. The optical fiber assembly of claim 12, wherein a relative refractive index between the core refractive index delta to the inner refractive index delta of the cladding layer is within a range of 0% to 3%, including endpoints.

21. The optical fiber assembly of claim 12, wherein the trench refractive index delta is within a range of −1% to −0.1%.

22. The optical fiber assembly of claim 12, wherein the trench segment has a width within a range of 2 to 10 μm, including endpoints.

23. The optical fiber assembly of claim 12, wherein the trench segment is offset from a central location of the inner core by a distance d within a range of 0 to 5 μm.

24. The optical fiber assembly of claim 11, wherein the inner cavity has a plurality of corners, each corner having a radius substantially equal to or less than a radius of an individual optical fiber of the plurality of optical fibers.

25. The optical fiber assembly of claim 11, further comprising a wedge tool operable to be inserted into the longitudinal slit.

26. An optical connection comprising:
an array of light emitting diodes; and
an optical fiber assembly comprising:
a plurality of optical fibers each having an end and comprising an inner core made of glass and a core refractive index delta and profile shape parameter α in the range of 1.8 to 2.6, including endpoints with a cladding layer surrounding the inner core, the cladding layer comprising an inner cladding segment having an inner refractive index delta with a trench segment having a trench refractive index delta, and an outer cladding segment having an outer refractive index delta, wherein:
the plurality of optical fibers form a two-dimensional array at the end;
each optical fiber of the plurality of optical fibers contact adjacent optical fibers of the plurality of optical fibers at the end; and
end faces of the plurality of optical fibers are coupled to the array of light emitting diodes; and
a connector housing comprising a front face and an inner cavity defining an opening at the front face, wherein the plurality of optical fibers is disposed within the inner cavity such that the end of the plurality of optical fibers are exposed at the opening.

27. The optical connection of claim 26, wherein each optical fiber further comprises a coating layer surrounding the cladding layer, the coating layer having a thickness of less than 30 μm and a modulus greater than or equal to 0.5 GPa.

28. The optical connection of claim 27, wherein the coating layer is a polymer.

29. The optical connection of claim 27, wherein the coating layer has a thickness uniformity about a circumference of the cladding layer that is at least 1 μm.

30. The optical connection of claim 29, wherein the coating layer has an overall diameter tolerance of ±0.5 μm.

31. The optical connection of claim 26, wherein the core refractive index delta is greater than the outer refractive index delta of the cladding layer.

32. The optical connection of claim 26, wherein a relative refractive index between the core refractive index delta to the inner refractive index delta of the cladding layer is within a range of 0% to 3%, including endpoints.

33. The optical connection of claim 26, wherein the trench refractive index delta is within a range of −1% to −0.1%.

34. The optical connection of claim 26, wherein the trench segment has a width within a range of 2 to 10 μm, including endpoints.

35. The optical connection of claim 26, wherein the trench segment is offset from a central location of the inner core by a distance d within a range of 0 to 5 μm.

36. The optical connection of claim 26, wherein individual light emitting diodes of the array of light emitting diodes have a transmission wavelength within a range of 420 nm to 850 nm, including endpoints.

37. The optical connection of claim 26, wherein the array of light emitting diodes comprises an array of micro light emitting diodes.

38. The optical connection of claim 37, wherein a pitch of the array of light emitting diodes is less than or equal to 250 μm.

* * * * *